United States Patent Office.

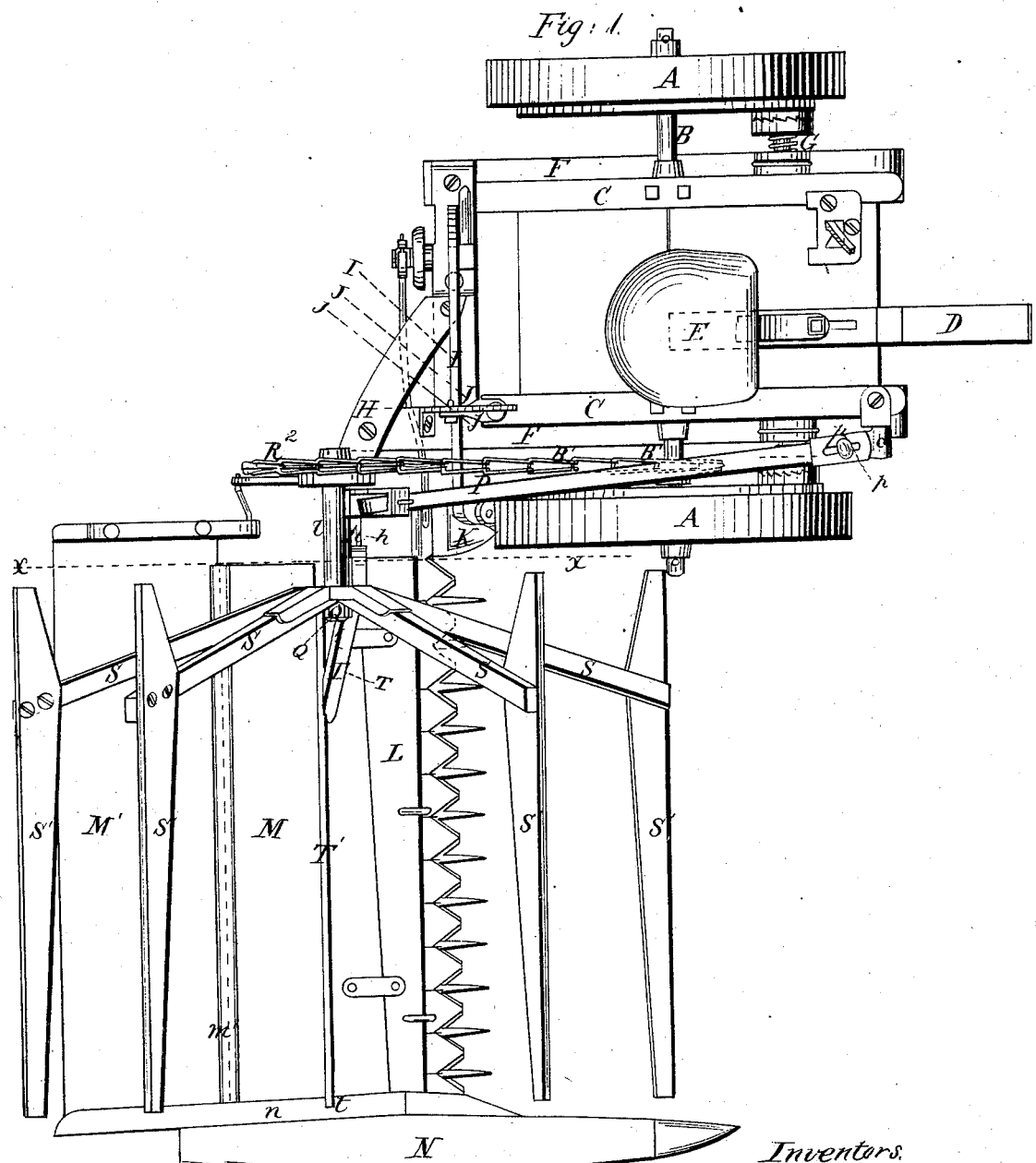

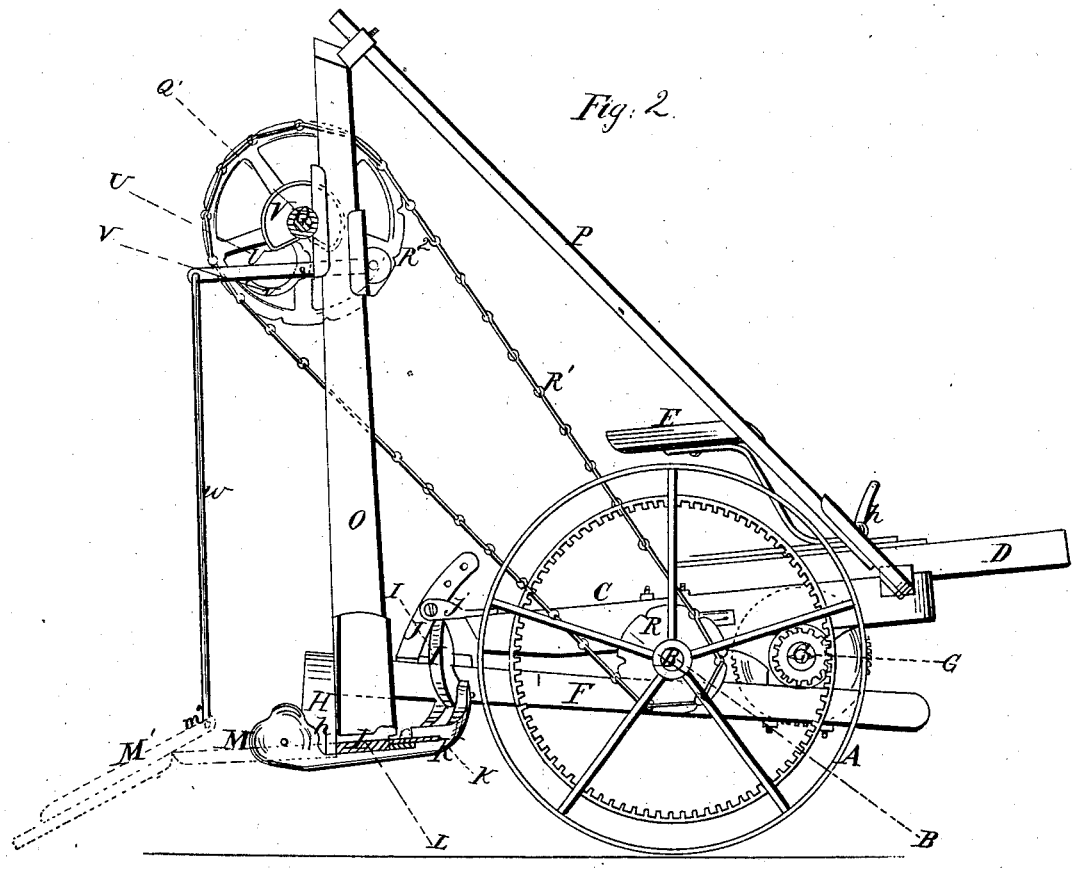

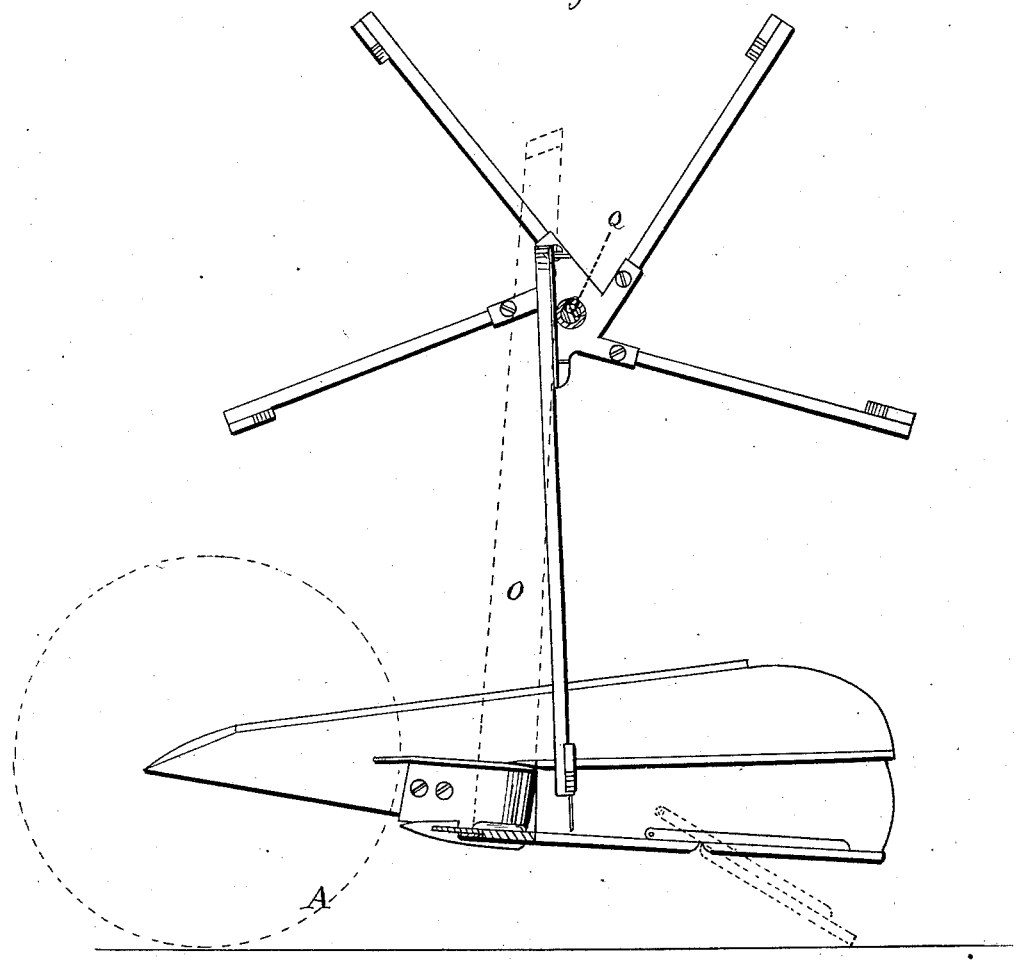

LEANDER J. McCORMICK, WILLIAM R. BAKER, AND LAMBERT ERPELDING, OF CHICAGO, ILLINOIS, ASSIGNORS TO C. H. McCORMICK AND BROTHER, OF SAME PLACE.

*Letters Patent No. 82,141, dated September 15, 1868.*

IMPROVEMENT IN HARVESTER-RAKES.

The Schedule referred to in these Letters Patent and making part of the same.

TO ALL WHOM IT MAY CONCERN:

Be it known that we, LEANDER J. McCORMICK, WILLIAM R. BAKER, and LAMBERT ERPELDING, all of Chicago, in the county of Cook, and State of Illinois, have invented certain new and useful Improvements in Harvesters, of which the following is a full, clear, and exact description, reference being had to the accompanying drawings, which make part of this specification, and in which—

Figure 1 represents a plan or top view of a harvester to which our improvements are applied.

Figure 2 represents a view in elevation of the same, as seen from the divider-side looking towards the main frame, with the reel, platform, and cutting-apparatus in section at the line $x$ $x$ of fig. 1.

Figure 3 represents a view, partly in elevation and partly in section, showing the reeling and raking-apparatus.

The invention herein claimed consists—

First, in a novel method of combining, in a harvester, a hinged finger-beam, a narrow, fixed platform attached to the finger-beam, a dropping-platform hinged to the fixed one, a reel-support mounted on the finger-beam, and supporting, reeling, and raking-devices revolving on a horizontal shaft.

Second, in a novel method of constructing the tripping-devices which operate the dropper.

It is obvious that some parts of our invention might be applied to many of the various styles of machines in use, without departing from the spirit of the invention.

The accompanying drawings represent all our improvements as combined in a machine for which Letters Patent of the United States, numbered 61,228, and dated January 15, 1867, were granted to L. J. McCORMICK and L. ERPELDING.

In this instance, two driving-wheels, A, are shown as mounted on an axle, B, supporting a main frame, C, from which a tongue, D, projects. A driver's seat, E, is also mounted on this frame. A supplementary frame, F, vibrates in proper bearings about a counter-shaft, G, driven by proper gearing from the main wheels, and communicating motion to the cutters in any usual, well-known way.

A shoe, K, to which the finger-beam L is secured in the usual way, is attached to the supplementary frame by a horizontal swivelling-pin, $h$, passing through a stirrup, H, depending from the inner rear corner of the frame, and pivoted to the heel of the shoe, while the toe is pivoted to an arched brace, I, extending over and pivoted to the stubble-side of the supplementary frame.

By this mode of attachment, which is not, however, here claimed to be new, the finger-beam can rise and fall at either end independently of the main frame, and also rock axially on its pivots, to raise or lower the points of the guards.

When it is desired to hold the supplementary frame and the heel-end of the finger-beam at a uniform height from the ground, and yet leave the finger-beam free to rock axially, as well as to rise and fall at its divider-end, the two frames are connected by bolting a rigid bar, J, on the supplementary frame, to a projecting arm, $j$, on the inner rear corner of the main frame. The finger-beam is provided with a cutting-apparatus of approved construction. A narrow platform, M, is rigidly secured to the finger-beam in any proper, well-known way that will admit of its being conveniently removed and replaced. A dropping-platform, M', is hinged, at its forward edge, $m$, to the rear edge of the fixed platform. A suitable divider and guard-board or fence, N, is bolted to the finger-beam, so that it may easily be removed when mowing. The rear end of this guard-board extends backward over the dropping-platform, the grain edge of which rises against its lower edge, when lifted, and is thus prevented from rising above that line.

A ledge or flange, $n$, extends the whole length of the guard-board, for a purpose hereinafter explained.

The divider-end of the finger-beam is supported by a suitable grain-wheel; such, for instance, as that shown in L. ERPELDING's patent of October 1, 1861, No. 33,416.

A post, O, is securely bolted, in any proper, well-known way, to the shoe, directly over the finger-beam. In order to adjust the tripping of the points of the guards, and at the same time prevent the oscillation of the reel-post backwards and forwards, we attach a brace-bar, P, to the top of the post, and pivot its other end to the inner front corner of the main frame, and adjust it by means of a socket and set-screw, $p$, as shown in fig. 1.

A short shaft, Q, mounted in suitable bearings, $q$, on the post O, supports the rake and reel-arms, and is driven by a sprocket or notched wheel, R, on the main axle between the wheels. An endless chain, $R^1$, encircles this wheel, and a corresponding one, $R^2$, on the outer end of the shaft Q.

It will be seen by the drawings that by our mode of arranging the parts, the shoe and reel-post are directly behind the driving-wheel, which arrangement diminishes side-draught, and enables us to drive the reel from the inside of the inner driving-wheel.

Arms S, arranged tangentially around the shaft Q, carry beaters or ribs S', which sweep over the platform in the usual way. These ribs, it will be observed, are all arranged on one side of the shaft, while an arm, T, carrying a rake-head, T', is arranged on the other side. The rake-arm is also arranged tangentially to the shaft, and the rake revolves in a path concentric with but outside of that of the beaters S', but all revolve in a fixed relation to the shaft Q. A projection, $t$, on the rake, travels on the flange $n$ of the guard-board when raking off, and thus prevents the rake-teeth from striking into the guards as the rake passes over them.

An arm, $m'$, on the stubble-side of the platform, is connected, by a link-rod, $u$, with an oscillating lever, U, pivoted to play vertically on the reel-post, and carrying a swivelled dog, $v$, which embraces a cam, V, on the shaft Q, and thus drops the platform at stated intervals, as hereinafter explained.

The operation is as follows:

As the machine advances, the beaters S' press the grain backwards upon the platform in the usual way. When the rake comes round, it sweeps the gavel back upon the dropper-platform, its sweep extending as far back as the rear edge thereof. As the gavel is swept back, the platform M' drops by its own weight, when the lever U enters the recess in the cam V, and the gavel slides upon the ground. As soon as the gavel is discharged, the cam V lifts the platform, and holds it up until the next discharge takes place.

What we claim as our invention, and desire to secure by Letters Patent, is—

1. The combination in a harvester, substantially as set forth, of a hinged finger-beam, a narrow platform affixed to the finger-beam, and a dropping-platform hinged to the fixed one, with a series of reel-ribs, and a rake revolving over the platform on a horizontal shaft, and mounted on a support secured on the shoe.

2. The combination, substantially as set forth, with the tripping-cam, of the vibrating-arm U, and oscillating-dog, for the purposes set forth.

In testimony whereof, we have hereunto subscribed our names.

L. J. McCORMICK,
WM. R. BAKER,
LAMBERT ERPELDING.

Witnesses:
C. A. SPRING, Jr.,
WM. R. SELLECK.